(12) United States Patent
Yen

(10) Patent No.: US 8,693,219 B2
(45) Date of Patent: Apr. 8, 2014

(54) POWER FACTOR IMPROVEMENT CIRCUIT WITH PHASE ADJUSTMENT AND CURRENT GAIN REDUCTION

(75) Inventor: Jui-Chih Yen, Taipei (TW)

(73) Assignees: Wafly Ltd., Taipei (TW); Jui-Chih Yen, Taipei (TW)

( * ) Notice: Subject to any disclaimer, the term of this patent is extended or adjusted under 35 U.S.C. 154(b) by 250 days.

(21) Appl. No.: 13/278,384

(22) Filed: Oct. 21, 2011

(65) Prior Publication Data

US 2013/0100708 A1 Apr. 25, 2013

(51) Int. Cl.
*H02M 3/335* (2006.01)

(52) U.S. Cl.
USPC .................. 363/21.16; 363/21.01; 363/21.15; 363/21.18

(58) Field of Classification Search
USPC ....................... 363/21.01, 21.15, 21.16, 21.18
See application file for complete search history.

(56) References Cited

U.S. PATENT DOCUMENTS

| | | | | |
|---|---|---|---|---|
| 4,888,821 A * | 12/1989 | Hamp et al. | ............... | 363/21.02 |
| 5,901,051 A * | 5/1999 | Takahashi et al. | ......... | 363/21.18 |
| 5,933,332 A * | 8/1999 | Honma | ............................. | 363/20 |
| 6,122,180 A * | 9/2000 | Seo et al. | .................... | 363/21.17 |
| 6,707,283 B1 * | 3/2004 | Ball | ............................. | 323/284 |
| 6,956,750 B1 * | 10/2005 | Eason et al. | ............... | 363/21.01 |
| 7,239,532 B1 * | 7/2007 | Hsu et al. | .................... | 363/21.12 |
| 2006/0056204 A1 * | 3/2006 | Yang et al. | ...................... | 363/10 |

* cited by examiner

*Primary Examiner* — Adolf Berhane
*Assistant Examiner* — Gary Nash
(74) *Attorney, Agent, or Firm* — Jackson IPG PLLC

(57) ABSTRACT

A power factor improvement circuit includes a low frequency filter unit installed between two electrodes of an output terminal of a rectifier unit for adjusting voltage and current inputted to a PWM control IC in-phase, and first and second compensation circuits installed at a current compensation terminal and a voltage compensation terminal of the PWM control IC respectively, and the first and second compensation circuits are provided for reducing the current gain of the phase adjustment unit to avoid any unnecessary action of the PWM control IC, so as to achieve the effect of controlling a power factor to a level over 0.90 when a full voltage of 90-264V is inputted.

2 Claims, 3 Drawing Sheets

POWER FACTOR IMPROVEMENT CIRCUIT WITH PHASE ADJUSTMENT AND CURRENT GAIN REDUCTION

FIELD OF THE INVENTION

The present invention relates to a power factor improvement circuit, in particular to the power factor improvement circuit with a small volume and a low cost and design of controlling a power factor to a level over 0.90 when a full voltage of 90~264V is inputted.

BACKGROUND OF THE INVENTION

In recent years, the market of consumer electronic products and LED driving circuits grows constantly and power converters come with a power saving function and a smaller size, so that related electrical and electronic devices usually adopt a conventional AC/DC converter which is also known as a peak rectifier and composed of four diodes and output capacitors. Such converter has the advantages of low cost and stable circuit and the disadvantages of low power factor and high harmonics.

As to electric power, an increase of power factor (PF) also increases the consumption the electric power, and a common solution is to install a power factor correction (PFC) device with a typical pulse width modulation (PWM) circuit (as shown in FIG. 1) to increase the power factor up to a range of 0.98~0.99. However, the whole system of this solution has the drawbacks of a large volume and a high cost and results in a limited application of compact electronic products.

Therefore, another passive power factor control technology adopting a passive component is provided to improve the power factor (PF) and a total harmonic distortion (THD) such as a valley fill circuit as shown FIG. 2. In general, the performance of the passive power factor control technology is very low and can barely meet the requirement or lower limit of an acceptable range of industrial standards.

As the development of green energies becomes a global issue, and the efficiency of electric power is taken seriously, semiconductor controlled power integrated circuits (IC) play an important role of enhancing the efficiency of the electric power, and the power IC control technology can save total cost and reduce unnecessary switching loss. This technology mainly uses a pulse DC signal with a positive half-cycle sinus waveform to modulate the width of duty cycle, so that a load can be operated continuously in a complete sinus waveform. However, the conventional power factor improvement circuit with the sinus waveform is simply used in the pulse DC signal with the positive half-cycle sinus waveform to modulate the pulse width of the duty cycle, and thus still causes a low efficiency of the circuit. Up to now, there is still no design available to improve the performance in order to control the power factor to a level over 0.90 when a full voltage of 90~264V is inputted.

SUMMARY OF THE INVENTION

In view of the aforementioned problem, it is a primary objective of the present invention to provide a power factor improvement circuit with a small volume and a low cost and a design of controlling the power factor to a level over 0.90 when a full voltage of 90~264V is inputted.

To achieve the foregoing objective, the present invention provides a power factor improvement circuit comprising: a rectifier unit, an IC starting unit, a filter unit, a PWM control IC, a power switching element, a transformer unit, a low frequency filter unit, and first and second compensation circuits; wherein the rectifier unit is provided for obtaining an AC sine-wave cycle signal of a utility power and converting the AC sine-wave cycle signal into a first pulse DC signal having a positive half-cycle sinus waveform; the IC starting unit is provided for obtaining the first pulse DC signal of the rectifier unit and dividing a voltage before outputting a second pulse DC signal; the filter unit is provided for obtaining the first pulse DC signal of the rectifier unit and filtering the first pulse DC signal before outputting a DC power signal; the PWM control IC is provided for obtaining the second pulse DC signal of the rectifier unit as a level signal and determining to output a power-on cycle signal according to the second pulse DC signal; the power switching element is provided for obtaining the power-on cycle signal of the PWM control IC and the DC power signal of the filter unit and dividing the DC power signal into a plurality of continuous voltage pulse signals according to the power-on cycle signal, so as to continue the voltage pulse signal; the transformer unit corresponds to the continuous voltage pulse signal received by each voltage pulse signal and operates the output voltage according to the input voltage of each voltage pulse signal, and the low frequency filter unit is installed between both electrodes of an output terminal of the rectifier unit for adjusting the voltage and current inputted to the PWM control IC in phase; and the first and second compensation circuits comprises a current compensation terminal of the PWM control IC and a RC circuit of the voltage compensation terminal for reducing a current gain of the PWM control IC, so that the PWM control IC has a peak (or a maximum peak value) invisible in each duty cycle waveform to avoid an unnecessary action of the PWM control IC.

The power factor improvement circuit of the present invention has the following advantages:

1. Small volume and low cost.
2. A single-stage PWM control IC can be simply applied in the PFC circuit to overcome the problem of unable to input a power factor when a full voltage3 of 90~264V is inputted and maintain the best performance with a PF of 0.90 and an efficiency over 85%.
3. The single-stage PWM control IC is used in a front-end feedback control mode and has a CV (constant voltage)/CC (constant current) or PWM control function and a secondary side CC/CV feedback function.
4. The single-stage PWM control IC can be simply applied to achieve the PFC and the high-efficiency LED or CCFL switching power driving circuit, and such arrangement not only can dim the LED or CCFL at the AC terminal, but also can overcome the blinking problem of the LED or CCFL.

DESCRIPTION OF THE PREFERRED EMBODIMENTS

The technical characteristics of the present invention will become apparent with the detailed description of the preferred embodiments accompanied with the illustration of related drawings as follows. It is noteworthy to point out that same numerals are used for representing respective elements for the description of the preferred embodiments and the illustration of the drawings.

Figure 1:
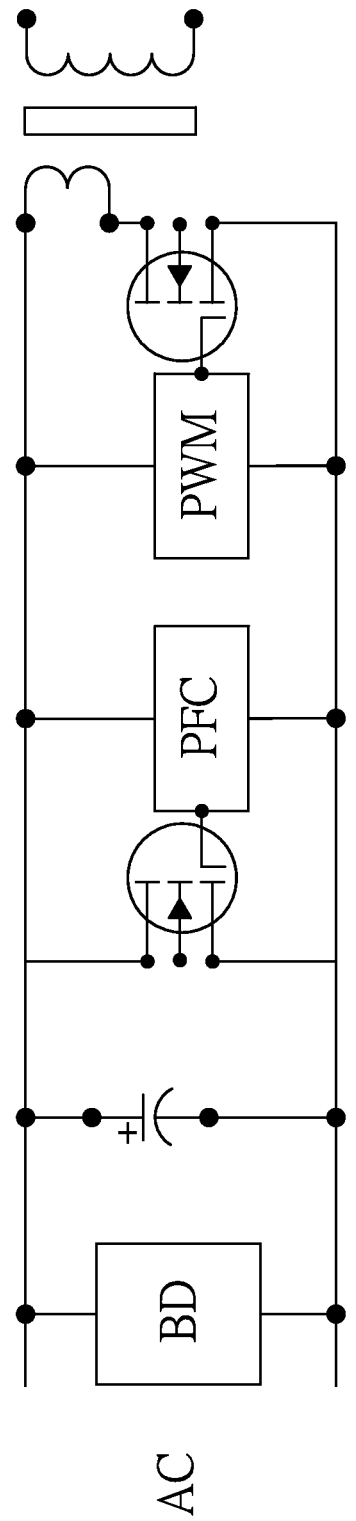
FIG. 1 is a schematic circuit diagram of a conventional active power factor control circuit.
Figure 2:
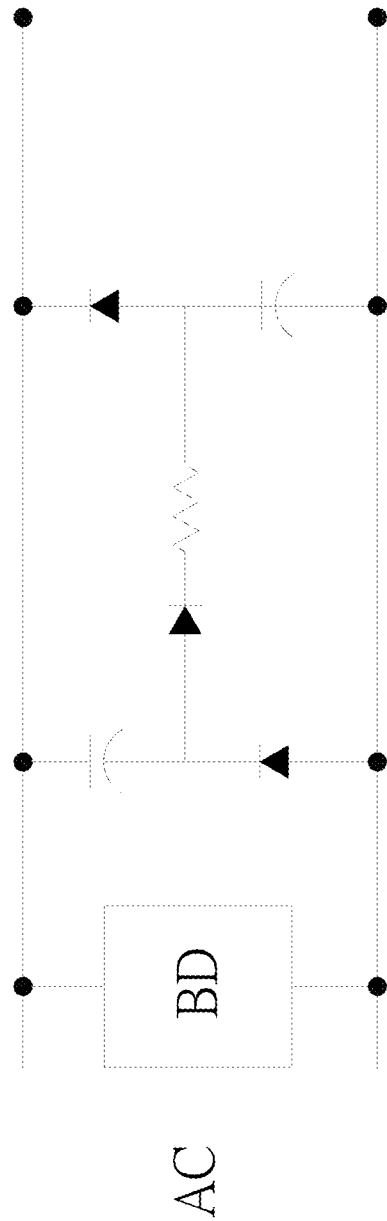
FIG. 2 is a schematic circuit diagram of a conventional passive power factor control circuit.
Figure 3:
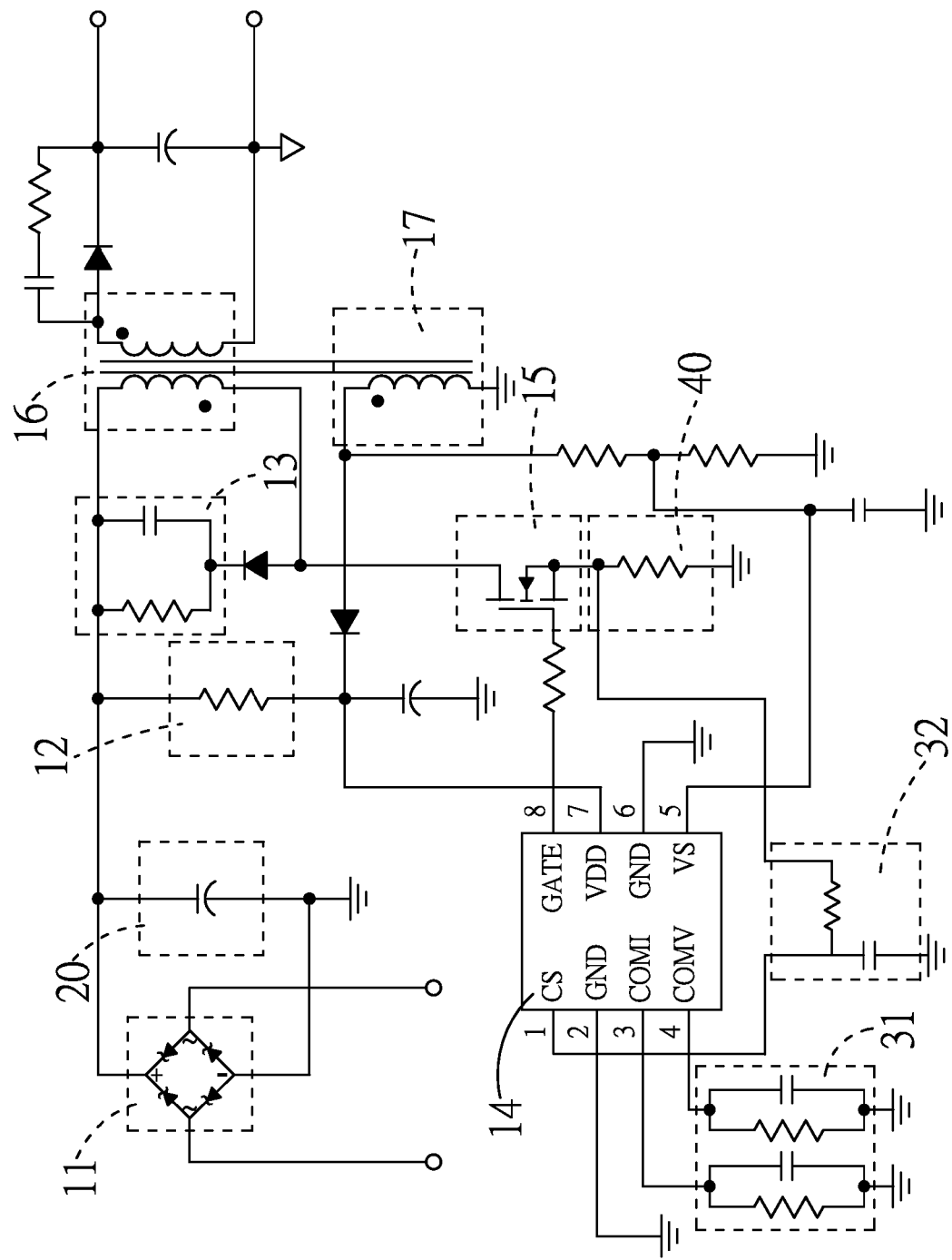
FIG. 3 is a schematic circuit diagram of a power factor improvement circuit in accordance with a preferred embodiment of the present invention.

With reference to FIG. 3 for a schematic circuit diagram of a power factor improvement circuit in accordance with a preferred embodiment of the present invention, the power factor improvement circuit comprises: a rectifier unit 11, an IC starting unit 12, a filter unit 13, a PWM control IC 14, a power switching element 15, a transformer unit 16, a low frequency filter unit 20, and first and second compensation circuits 31.

Wherein, the rectifier unit 11 is a full-wave bridge rectifier as shown in the figure for converting an AC sine-wave cycle signal of a utility power into a first pulse DC signal with a positive half-cycle sinus waveform.

The IC starting unit 12 is a resistor as shown in the figure for obtaining the first pulse DC signal of the rectifier unit 11 and dividing the voltage before outputting a second pulse DC signal.

The filter unit 13 can be a RC filter as shown in the figure for obtaining the first pulse DC signal of the rectifier unit 11 and filtering the wave before outputting a DC power signal, and providing a surge smoothing produced by the high-frequency switching circuit to reduce the production of noises.

The PWM control IC14 can be a single-stage PWM control IC as shown in the figure for obtaining the second pulse DC signal of the rectifier unit 11 as a level signal, and determine to output a power-on cycle signal according to the second pulse DC signal.

The power switching element 15 can be a channel enhancement mode MOSFET as shown in the figure for obtaining the power-on cycle signal of the PWM control IC14 and the DC power signal of the filter unit, and dividing the DC power signal into a plurality of continuous voltage pulse signals according to the power-on cycle signal, so as to continue the voltage pulse signal.

The transformer unit 16 corresponds to the continuous voltage pulse signal received by each voltage pulse signal and operates the output voltage according to the input voltage of each voltage pulse signal.

The low frequency filter unit 20 is installed between both electrodes of an output terminal of the rectifier unit 11 for adjusting the voltage and current inputted to the PWM control IC 14 in phase.

The first and second compensation circuits 31 are coupled to a current compensation terminal (COM1) of the PWM control IC 14 and a voltage compensation terminal (COMV) of the RC circuit as shown in the figure for reducing a current gain of the PWM control IC 14, so that the PWM control IC 14 has a peak (or a maximum peak value) invisible in each duty cycle waveform to avoid an unnecessary action of the PWM control IC 14.

Basically, the aforementioned technical characteristics are used for the power factor improvement circuit of the present invention to drive the voltage and current inputted to the PWM control IC14 in-phase, and the current varies with the voltage, so as to achieve the effect of enhancing the power factor (PF). In other words, if the output reaches ⅔ of a predetermined value, a change of the duty cycle of the phase adjustment unit 32 causes the duty cycle to change continuously with the waveform due to the change of the Input. Since operating frequency of the PWM control IC14 is greater than 120 HZ or 100 HZ, therefore there are over 400 times of ON/OFF switching for every 100 HZ to generate the current, so as to achieve the effect of a high power factor (PF).

In the meantime, the first and second compensation circuits 31 are used to reduce the current gain of the PWM control IC14 to provide the function of a constant duty cycle, so that the PWM control IC has no PEAK (maximum peak value) waveform in each duty cycle to avoid unnecessary operation of the PWM control IC. Its effect is analogous to changing a cycle by cycle current mode into a RMS current mode to obtain a constant duty Cycle (ON), so as to increase the PF steadily and achieve the effect of controlling the power factor to a level over 0.90 when a full voltage of 90~264V is inputted.

Of course, a preferred embodiment of the power factor improvement circuit of the present invention can further include an auxiliary winding 17 used together with the transformer unit 16 to feed back a detected voltage to the PWM control IC14 for comparing an internal reference voltage of the PWM control IC14, so as to achieve the function of a constant voltage.

Further, a phase adjustment unit 32 can be installed between the current detection terminal (CS) of the PWM control IC14 and the power switching element 15 for providing a better effect of the first and second compensation circuits 31. The phase adjustment unit 32 can be a RC circuit coupled between the current detection terminal (CS) of the PWM control IC14 and the power switching element 15 as shown in the figure, or an impedance element 40 is installed in parallel between the current detection terminal (CS) of the PWM control IC 14 and the voltage control element 15 for adjusting the maximum output power of the PWM control IC 14, and the impedance element 40 can be a resistor (RCS) as shown in the figure. The maximum output power of the PWM control IC14 can be achieved by simply changing the resistance.

More specifically, the present invention provides a power factor improvement method without using any PFC active circuit or valley fill circuit, but mainly uses a basic D=K mathematical model for the adjustment reference. For example, the best operation point of the transformer unit is set at 90V Duty≤0.7 and 264V Duty≥0.3, and the CDL value of the low frequency filter unit 20 is set to 0.10 uF~0.35 uF/450V, and the resistance RCS of the impedance element 40 sets the output current to a maximum output current, and the CAPCOMI is amplified to 105/16V, and the current gain is set to 1, so that the condition of PFC≥0.90 can be maintained at the condition of 90~264V AC Input/Full Load.

Compared with the prior art, the power factor improvement circuit of the present invention has the following advantages:

1. Small volume and low cost.

The single-stage PWM control IC can be simply applied in the PFC circuit to overcome the problem of unable to input a power factor when a full voltage3 of 90~264V is inputted and maintain the best performance with a PF of 0.90 and an efficiency over 85%.

3. The single-stage PWM control IC is used in a front-end feedback control mode and has a CV (constant voltage)/CC (constant current) or PWM control function and a secondary side CC/CV feedback function.

4. The single-stage PWM control IC can be simply applied to achieve the PFC and the high-efficiency LED or CCFL switching power driving circuit, and such arrangement not only can dim the LED or CCFL at the AC terminal, but also can overcome the blinking problem of the LED or CCFL.

While the invention has been described by means of specific embodiments, numerous modifications and variations could be made thereto by those skilled in the art without departing from the scope and spirit of the invention set forth in the claims.

What is claimed is:

1. A power factor improvement circuit, comprising:

a rectifier unit, for obtaining an AC sine-wave cycle signal of a utility power and converting the AC sine-wave cycle signal into a first pulse DC signal having a positive half-cycle sinus waveform;

an IC starting unit, for obtaining the first pulse DC signal of the rectifier unit, and dividing a voltage before outputting a second pulse DC signal;

a filter unit, for obtaining the first pulse DC signal of the rectifier unit and filtering the first pulse DC signal before outputting a DC power signal;

a PWM control IC, for obtaining the second pulse DC signal of the rectifier unit as a level signal, and determining to output a power-on cycle signal according to the second pulse DC signal;

a power switching element, for obtaining the power-on cycle signal of the PWM control IC and the DC power signal of the filter unit, and dividing the DC power signal into a plurality of continuous voltage pulse signals according to the power-on cycle signal, so as to continue the voltage pulse signals;

a transformer unit, corresponding to the continuous voltage pulse signal received by each voltage pulse signal, and operating an output voltage according to an input voltage of each voltage pulse signal;

an auxiliary winding used together with the transformer unit to feed back a detected voltage to the PWM control IC for comparing a reference voltage of the PWM control IC, so as to achieve the function of a constant voltage;

a low frequency filter unit, installed between both electrodes of an output terminal of the rectifier unit, for adjusting the voltage and current inputted to the PWM control IC in phase;

first and second RC compensation circuits, connected to a current compensation terminal and a voltage compensation terminal respectively of the PWM control IC, for reducing a current gain of the PWM control IC, so that the PWM control IC has a peak (or a maximum peak value) invisible in each duty cycle waveform to avoid an unnecessary action of the PWM control IC;

a phase adjustment unit installed between a current detection terminal of the PWM control IC and the power switching element so as to provide an enhanced effect of the first and second compensation circuits; and an adjustable impedance element coupled in parallel between the current detection terminal of the PWM control IC and the power switching element so as to adjust a maximum output power.

2. The power factor improvement circuit of claim 1, wherein the phase adjustment unit is a RC circuit coupled between the current detection terminal of the PWM control IC and the power switching element.

* * * * *